US010132260B2

United States Patent
Meldrum et al.

(10) Patent No.: US 10,132,260 B2
(45) Date of Patent: Nov. 20, 2018

(54) METHOD OF CONTINUOUSLY CALCULATING TRAPPED AND SCAVENGED AIR PER CYLINDER

(71) Applicant: GM Global Technology Operations LLC, Detroit, MI (US)

(72) Inventors: Jay S. Meldrum, Novi, MI (US); Gary Robert Cygan, Jr., Auburn Hills, MI (US); Layne K. Wiggins, Dexter, MI (US); Bastian Maass, Trebur (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 175 days.

(21) Appl. No.: 15/055,134

(22) Filed: Feb. 26, 2016

(65) Prior Publication Data

US 2017/0248093 A1    Aug. 31, 2017

(51) Int. Cl.

| | |
|---|---|
| *F02D 41/18* | (2006.01) |
| *F02D 41/26* | (2006.01) |
| *G01M 15/05* | (2006.01) |
| *G01M 15/09* | (2006.01) |
| *F02D 41/14* | (2006.01) |
| *F02D 13/02* | (2006.01) |
| *F02D 41/00* | (2006.01) |

(52) U.S. Cl.
CPC ......... *F02D 41/18* (2013.01); *F02D 13/0261* (2013.01); *F02D 41/0007* (2013.01); *F02D 41/1405* (2013.01); *F02D 41/263* (2013.01); *G01M 15/05* (2013.01); *G01M 15/09* (2013.01); *F02D 2041/001* (2013.01); *F02D 2200/0402* (2013.01); *F02D 2200/0406* (2013.01); *F02D 2200/0411* (2013.01); *Y02T 10/144* (2013.01); *Y02T 10/18* (2013.01)

(58) Field of Classification Search
CPC ...... F02D 41/18; F02D 41/263; G01M 15/05; G01M 15/09
USPC ...................................... 73/114.79
See application file for complete search history.

(56) References Cited

U.S. PATENT DOCUMENTS

| | | | | |
|---|---|---|---|---|
| 6,152,102 | A * | 11/2000 | Ruman | F02B 17/00 123/295 |
| 2012/0316756 | A1 * | 12/2012 | Tsuyuki | F02D 35/023 701/104 |
| 2013/0152584 | A1 * | 6/2013 | Jankovic | F02D 41/1456 60/611 |

* cited by examiner

*Primary Examiner* — Manish S Shah
*Assistant Examiner* — Timothy Graves

(57) ABSTRACT

Computational models and calculations relating to trapped and scavenged air per cylinder (APC) improve scavenging and non-scavenging operational modes of internal combustion engines as well as the transition there-between. Data from sensors which include engine speed, manifold air pressure, barometric pressure, crankshaft position, and valve state are provided to a pair of artificial neural networks. A first neural network utilizes this data to calculate the nominal volume of gas, i.e., air trapped in the cylinder. A second neural network utilizes this data to calculate the trapping ratio. The output of the first network is utilized with the ideal gas law to calculate the actual mass of trapped APC. The actual mass of trapped APC is also divided by the trapping ratio calculated by the second network to determine the total APC and is further utilized to calculate the scavenged APC by subtracting the trapped APC from the total APC.

13 Claims, 2 Drawing Sheets

METHOD OF CONTINUOUSLY CALCULATING TRAPPED AND SCAVENGED AIR PER CYLINDER

FIELD

The present disclosure relates to improving calculations relating to trapped air per cylinder (APC) in internal combustion engines and more specifically to improving computational models and calculations relating to trapped and scavenged air per cylinder during scavenging and non-scavenging operational modes in internal combustion engines.

BACKGROUND

The statements in this section merely provide background information related to the present disclosure and may or may not constitute prior art.

In modern internal combustion engines, particularly those employing turbochargers and variable valve timing, a certain percentage of air entering the engine through the intake manifold will pass completely through the engine cylinders, i.e., from the intake valves to the exhaust valves, during the intake stroke and will thus not participate in the combustion cycle. This can occur during high cam (and valve opening) overlap on boosted applications, especially at higher pressure ratios. This untrapped air passing completely through the cylinder is referred to as scavenged air.

While one might perceive such scavenged air, in the first analysis, as undesirable, it does allow the turbocharger to spool up more quickly, thereby improving pressure boost response. The true difficulty of scavenged air is that engines which operate in a scavenging mode, not surprisingly, also operate in the more conventional, non-scavenging mode in which all the air passing through the intake valve is trapped in the cylinder for the compression and power stroke, after which it is exhausted. While such engines typically employ separate control models for operation in the scavenging and non-scavenging modes, the transition between the non-scavenging mode, typically at lower RPM's, and the scavenging mode, at higher RPM's, can be abrupt and create discontinuities in both the monitoring and operation of fuel, air flow and ignition systems.

Thus, there is an acknowledged problem in internal combustion engines and controls which operate in both scavenging and non-scavenging modes. The present invention addresses this problem.

SUMMARY

The present invention is directed to improving operation of internal combustion engines by improving computational models and calculations relating to trapped and scavenged air per cylinder during scavenging and non-scavenging operational modes as well as seamless transition between such operational modes. Data from sensors which include engine speed (RPM), manifold air pressure, barometric pressure, crankshaft position, intake valve maximum open position, exhaust valve maximum open position and valve state sensors are provided to a pair of artificial neural networks (ANN). A first neural network, the trapped volumetric efficiency ANN, utilizes this data to calculate the nominal volume of gas, i.e., air trapped in the cylinder. A second, trapping ratio, ANN utilizes this data to calculate the trapping ratio. The output of the first ANN is utilized, in conjunction with the ideal gas law, to calculate the actual mass of trapped air per cylinder (APC). The actual mass of trapped air per cylinder is also divided by the trapping ratio calculated by the second ANN to determine the total air per cylinder and is further utilized to calculate the scavenged air per cylinder by subtracting the trapped air per cylinder from the total air per cylinder. It will be appreciated that the foregoing calculations are done in real time and thus that the three data outputs trapped, scavenged and total air per cylinder are provided continuously and may and will be utilized by various engine and vehicle control modules and systems to improve overall engine and vehicle performance.

Thus it is an aspect of the present invention to provide a method of improving operation of internal combustion engines operating in scavenging and non-scavenging modes.

It is a further aspect of the present invention to provide a method of operation of scavenging and non-scavenging internal combustion engines which provides a seamless transition between such scavenging and non-scavenging modes of operation.

It is a still further aspect of the present invention to provide a method of improving operation of internal combustion engines operating in scavenging and non-scavenging modes utilizing artificial neural networks.

It is a still further aspect of the present invention to provide a method of improving operation of internal combustion engines operating in scavenging and non-scavenging modes utilizing artificial neural networks and sensors including manifold air pressure, barometric pressure, engine speed and crankshaft angle and valve state sensors.

It is a still further aspect of the present invention to provide an apparatus for improving operation of internal combustion engines operating in scavenging and non-scavenging modes utilizing artificial neural networks and sensors including manifold air pressure, barometric pressure, engine speed and crankshaft angle and valve state sensors.

It is a still further aspect of the present invention to provide a method of improving operation of internal combustion engines operating in scavenging and non-scavenging modes by calculating and providing to related engine and vehicle control systems real time values of trapped air per cylinder, scavenged air per cylinder and total air per cylinder.

It is a still further aspect of the present invention to provide a method of improving operation of internal combustion engines having scavenging and non-scavenging modes by utilizing artificial neural networks and sensors including manifold air pressure, barometric pressure, engine speed and crankshaft angle and valve state sensors to provide to related engine and vehicle control systems real time values of trapped air per cylinder, scavenged air per cylinder and total air per cylinder.

It is a still further aspect of the present invention to provide an apparatus for improving operation of internal combustion engines having scavenging and non-scavenging modes by utilizing artificial neural networks and sensors including manifold air pressure, barometric pressure, engine speed and crankshaft angle and valve state sensors to provide to related engine and vehicle control systems real time values of trapped air per cylinder, scavenged air per cylinder and total air per cylinder.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
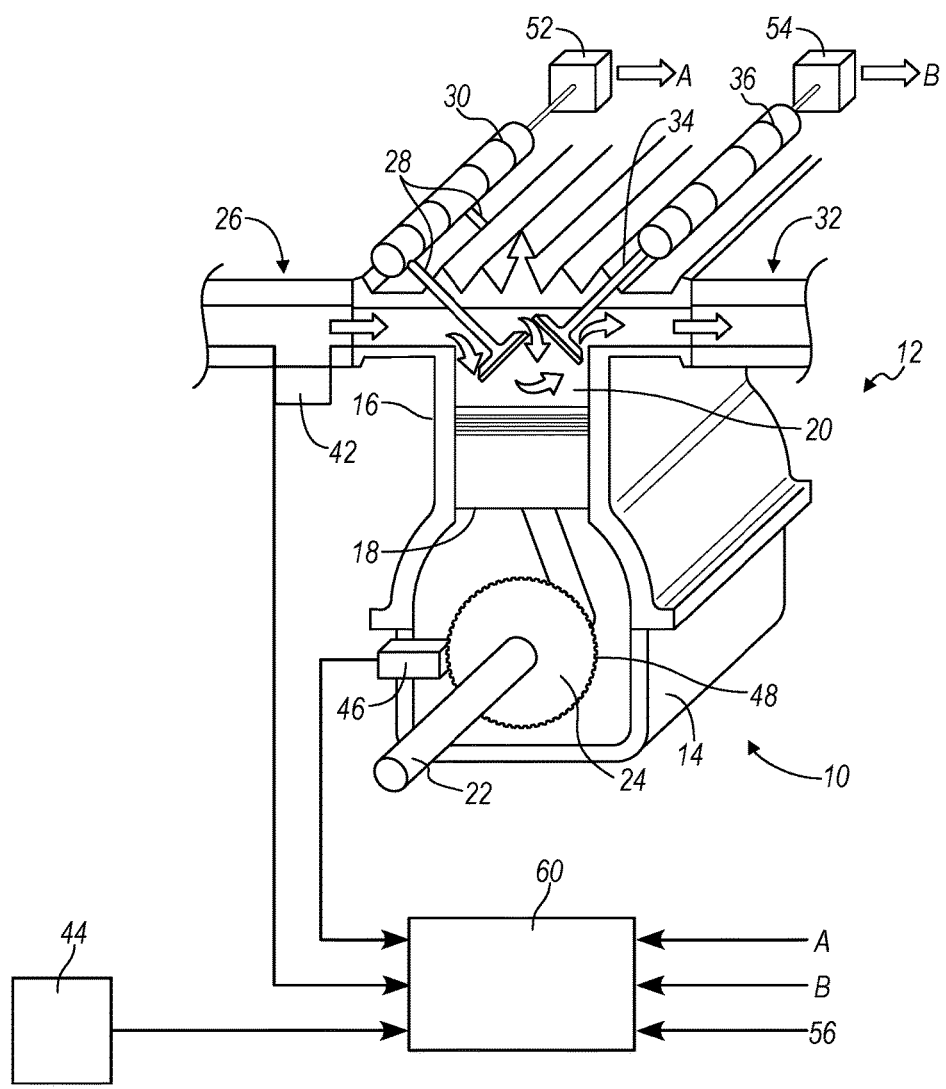
FIG. 1 is a pictorial view of an internal combustion engine having sensors and scavenging, non-scavenging operation according to the present invention.

With reference to FIG. 1, a pictorial representation of an internal combustion engine, sensors and associated components of the system according to the present invention is illustrated and generally designated by the reference number 10. The system 10 includes the internal combustion engine 12 having a multiple part body including an engine block 14 and one or more cylinder heads 16 which receive, locate, and support a plurality of reciprocating pistons 18 disposed in a like plurality of cylinders 20, one of each of which is illustrated in FIG. 1, a rotating crankshaft 22 and flywheel 24, an intake manifold 26 including a plurality of intake valves 28 associated with a first or intake camshaft 30 which is driven by the crankshaft 22, an exhaust manifold 32 including a plurality of exhaust valves 34 associated with a second or exhaust camshaft 36 which is also driven by the crankshaft 22. Those skilled in the art will understand that the exemplary internal combustion engine 12 illustrated includes additional details and components such as, for example, fuel supply and ignition systems (both not illustrated).

The system 10 also includes a plurality of sensors. A first, manifold absolute pressure (MAP) sensor 42 resides in the intake manifold 24 and senses the absolute, instantaneous air pressure therein. A second, barometric pressure sensor 44 may be located at any convenient location on the motor vehicle (not illustrated) and senses the current ambient atmospheric pressure. A third, speed and rotational (angular) position sensor 46 is associated with teeth 48 on the flywheel 24 on the crankshaft 22 and provides data regarding both the rotational speed and angular position of the crankshaft 22. Data regarding the rotational positions of the intake and exhaust camshafts 30 and 36 are provided by a fourth, intake camshaft position sensor 52 and a fifth, exhaust camshaft position sensor 54. Outputs from all of the forgoing sensors 42, 44, 46, 52 and 54 are provided to a control module 60 that may be a stand-alone device or may a portion of an engine control module (ECM) or other, similar electronic controller having input and output features, fixed memory for software and transient memory for such input data, a processor or microprocessor and related circuits. A sixth stream of data 56 which may be provided to the control module 60, generated therein or in an associated ECM relates to the operational state of the intake valves 28 and exhaust valves 34 which is defined and identified by three operating modes or states: high lift, low lift or deactivated, i.e., neither high nor low lift state.

Figure 2:
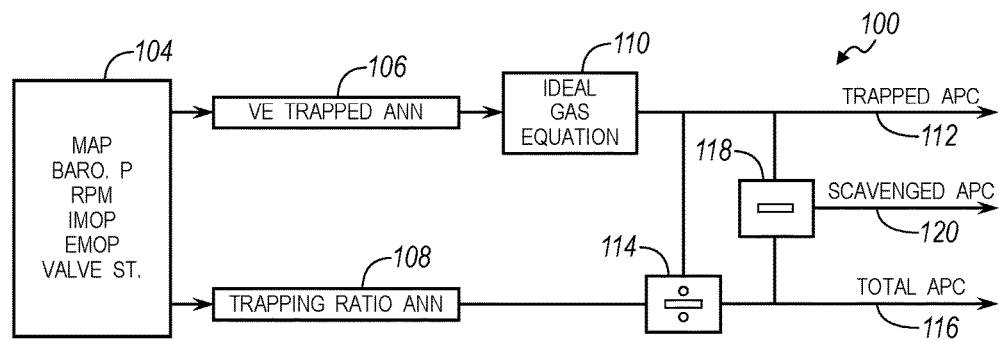
FIG. 2 is a schematic diagram of the components and operational steps of a scavenging, non-scavenging internal combustion engine control system according to the present invention.

Referring now to FIG. 2, a schematic, block diagram of the components and method steps of a scavenging, non-scavenging internal combustion engine control system are illustrated and generally designated by the reference number 100. The method 100 comprehends gathering data in a step 104 from the manifold absolute pressure (MAP) sensor 42, the barometric pressure sensor 44, the crankshaft (engine) speed and rotation sensor 46, the intake maximum opening position (IMOP) sensor 52, the exhaust maximum opening position (EMOP) sensor 54 and the valve state data stream 56. The IMOP sensor 52 and the EMOP sensor 54 provide data in degrees of rotation (from 0° to 360°) of their respective camshafts and this data, combined with the data from the third, speed and rotational position sensor 46, is utilized to determine the rotational (angular) position from 0° to 720° of the crankshaft 22.

The six sensor outputs or data streams are provided to both a first, volumetric efficiency (VE) artificial neural network (ANN) 106 and a second, trapping ratio artificial neural network (ANN) 108. Both the first and the second artificial neural networks 106 and 108 are single layer networks and contain a set of adaptive weights, i.e., numerical parameters that are adjusted by a learning algorithm during the calibration process, and are capable of approximating or estimating non-linear functions of the six inputs. One of the hallmarks of the neural networks 106 and 108 is that given a certain set of input values, the networks 106 and 108 will always return the same output value.

From the data provided to it, the first, volumetric efficiency (VE) artificial neural network (ANN) 106 provides a value of the current volumetric efficiency of trapped air per cylinder (APC) on a scale of 0.0 to 1.0.

During the VE calibration process, the equation utilized is:

$$VE = \frac{m_{cylinder} \cdot R \cdot ChrgTemp}{\text{molar mass} \cdot MAP \cdot V_{cylinder}}$$

where R is the ideal gas constant of 8.314 L kPa/(K mol), the molar mass is 28970 L kPa/(mg·K), $V_{cylinder}$ is the volume of each cylinder 20 in liters and the ChrgTemp is the temperature of air entering the cylinders 20 in degrees Kelvin.

This value is then provided to a computation step 110 which applies the ideal gas law to the volumetric efficiency value to determine the actual mass of air trapped in each cylinder (APC) 20 in real time. The equation utilized to determine the mass of air per cylinder 20 is:

$$m_{cylinder} = \frac{\text{molar mass} \cdot MAP \cdot VE}{R \cdot ChrgTemp}$$

The resultant $m_{cylinder}$ is the trapped mass of air in each cylinder 20 in milligrams.

This data or information is then provided in a line 112 to various data systems and controllers in the vehicle such as the engine control module (ECM) to adjust fuel flow, spark timing, and estimate such operating parameters as exhaust temperature and pressure.

From the data provided to the second, trapping ratio artificial neural network (ANN) 108, the ratio of the volume of air trapped per cylinder 20 to the total volume of air provided per cylinder 20 is generated. This data or information is provided to a divide by network or step 114.

Knowing the actual mass of air trapped per cylinder 20 from the computational step 110 and the ratio of the mass of air trapped per cylinder 20 to the total mass of air provided per cylinder 20, the total mass of air per cylinder 20 is calculated and provided in a data or information line 116 to various data systems and controllers in the vehicle such as the engine control module (ECM). Finally, in a subtraction step or network 118, the instantaneous value of the trapped air per cylinder 20 in the line 112 is subtracted from the instantaneous value of the total air per cylinder in the line 116. The resulting value in a line 120 is the scavenged air per cylinder 20, that is, the air that, due to opening overlap of the intake valve(s) 28 and the exhaust valve(s) 34, passes through the cylinder(s) 20 directly from the intake manifold 26 to the exhaust manifold 32 without participating in the combustion process.

Figure 3:
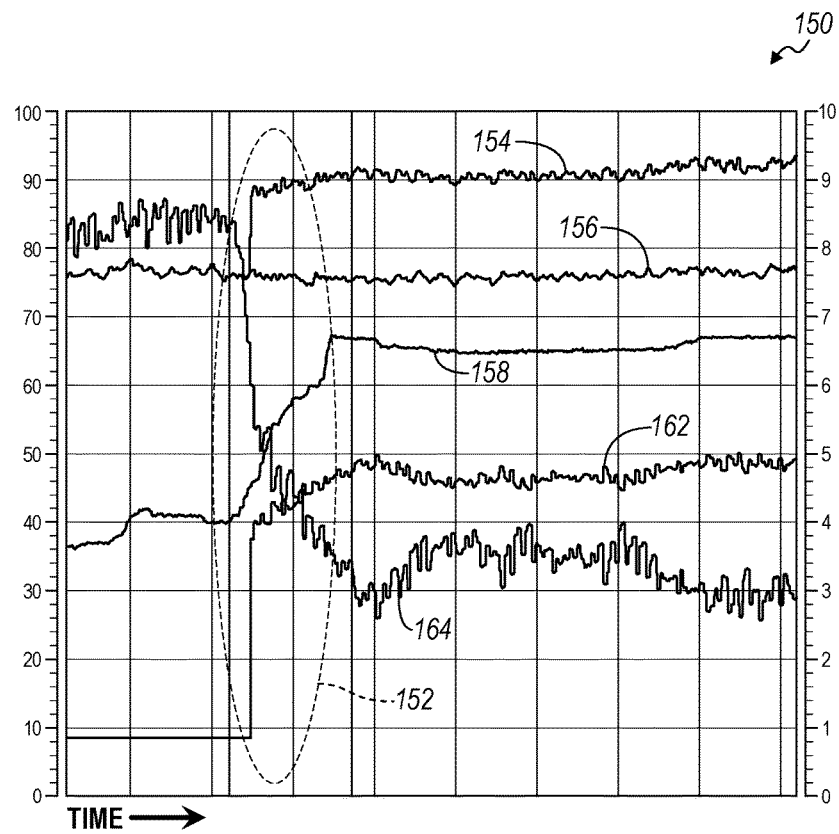
FIG. 3 is a chart illustrating several operating parameters of a scavenging, non-scavenging internal combustion engine control system according to the present invention.

Referring now to FIG. 3, a multiple plot graph 150 illustrates the performance of the scavenging, non-scavenging internal combustion engine control system 10. First of all, it should be understood that area enclosed by the dashed oval line 152 generally represents the region of transition from non-scavenging operation (on the left side of the graph 150) to scavenging operation (on the right side of the graph 150). The uppermost line or trace 154 represents the total air per cylinder (APC) 20. The second, essentially horizontal line or trace 156 represents to trapped air per cylinder 20. Note that during non-scavenging operation (on the left side of the graph 150), the traces 154 and 156 lie on top of one another. The third line or trace 158 represents the throttle area which, of course, increases as speed and load increase. The fourth line or trace 162 represents the scavenged air per cylinder 20. Note the sharp increase of this value as operation moves from non-scavenging to scavenging in the area enclosed by the dashed line 152. Finally, a fifth line or trace 164 represents the trapping ratio. Note that this value changes relatively smoothly from scavenging to non-scavenging operation, a significant goal of the scavenging, non-scavenging internal combustion engine control system 10.

The description of the invention is merely exemplary in nature and variations that do not depart from the gist of the invention are intended to be within the scope of the invention. Such variations are not to be regarded as a departure from the spirit and scope of the invention.

What is claimed is:

1. A method of determining instantaneous trapped and scavenged air per cylinder in an internal combustion engine, comprising the steps of
    determining a manifold air pressure,
    determining a rotational speed and position in degrees of a crankshaft of the internal combustion engine,
    determining an intake valve maximum opening position in degrees,
    determining an exhaust valve maximum opening position in degrees,
    calculating a volumetric efficiency of trapped air per cylinder and applying the ideal gas law to the volumetric efficiency of trapped air per cylinder to calculate a value of a mass of trapped air per cylinder,
    providing the value of the mass of trapped air per cylinder to an engine control module, wherein the engine control module adjusts fuel flow and spark timing based, at least in part, on the mass of trapped air per cylinder,
    calculating a ratio of the volume of air trapped per cylinder to the total volume of air provided per cylinder,
    calculating a value of total mass of air per cylinder,
    providing the value of the total mass of air per cylinder to an engine control module, and
    subtracting the trapped air per cylinder from the total volume of air per cylinder to determine the scavenged air per cylinder.

2. The method of claim 1 further including the step of determining an ambient barometric pressure.

3. The method of claim 1 further including the step of determining a valve state as one of high lift, low lift or no lift.

4. The method of claim 1 further including the step of providing a plurality of rotational sensors having outputs supplied to the engine control module.

5. A method of determining instantaneous trapped air per cylinder and scavenged air per cylinder in an internal combustion engine, comprising the steps of
    determining a manifold air pressure,
    determining a rotational speed and position in degrees of a crankshaft of the internal combustion engine,
    determining an intake valve maximum opening rotational position in degrees,
    determining an exhaust valve maximum opening rotational position in degrees,
    calculating a volumetric efficiency of trapped air per cylinder and applying the ideal gas law to the volumetric efficiency of trapped air per cylinder to calculate a mass of trapped air per cylinder,
    providing the value of the mass of trapped air per cylinder to an engine control module, wherein the engine control module adjusts fuel flow and spark timing based, at least in part, on the mass of trapped air per cylinder,
    calculating a ratio of the mass of air trapped per cylinder to the total volume of air provided per cylinder in an artificial neural network,
    calculating a total mass of air per cylinder, and
    calculating a scavenged air per cylinder by subtracting the trapped air per cylinder from the total mass of air per cylinder.

6. The method of claim 5 further including the step of determining an ambient barometric pressure.

7. The method of claim 5 further including the step of determining a valve state as one of high lift, low lift or no lift.

8. The method of claim 5 further including the step of providing a first position sensor on an intake valve camshaft to determine the intake valve maximum opening position.

9. The method of claim 5 further including the step of providing a second position sensor on an exhaust valve camshaft to determine the exhaust valve maximum opening position.

10. The method of claim 5 further including the step of providing a rotation sensor associated with a flywheel on the crankshaft.

11. A method of determining instantaneous trapped and scavenged air per cylinder in an internal combustion engine, comprising the steps of
    determining a manifold air pressure,
    determining an ambient barometric pressure,
    determining a rotational speed and position in degrees of a crankshaft of the internal combustion engine,
    determining an intake valve maximum opening position in degrees,
    determining an exhaust valve maximum opening position in degrees,
    calculating a volumetric efficiency of trapped air per cylinder and applying the ideal gas law to the volumetric efficiency of trapped air per cylinder to calculate a mass of trapped air per cylinder, providing the value of the mass of trapped air per cylinder to an engine control module, wherein the engine control module adjusts fuel flow and spark timing based, at least in part, on the mass of trapped air per cylinder, calculating a ratio of the mass of air trapped per cylinder to the total volume of air provided per cylinder, calculating a total mass of air per cylinder, and subtracting the trapped air per cylinder from the total mass of air per cylinder to determine the scavenged air per cylinder.

12. The method of claim 11 further including the step of determining the valve state as one of high lift, low lift or no lift.

13. The method of claim 11 further including the step of providing a plurality of sensors having outputs connected to the engine control module.

* * * * *